United States Patent
Bello et al.

(10) Patent No.: US 8,095,628 B2
(45) Date of Patent: Jan. 10, 2012

(54) CONSOLIDATED NOTIFICATIONS TO NFS CLIENTS

(75) Inventors: Adekunle Bello, Austin, TX (US); Radhika Chirra, Austin, TX (US); Aruna Yedavilli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 12/605,880

(22) Filed: Oct. 26, 2009

(65) Prior Publication Data

US 2011/0099253 A1 Apr. 28, 2011

(51) Int. Cl.
*G06F 15/177* (2006.01)
*G06F 15/173* (2006.01)

(52) U.S. Cl. .......... 709/221; 709/229; 710/200

(58) Field of Classification Search .......... 709/203, 709/217, 221, 224, 229, 250; 707/999.101, 707/999.108, E17.032; 710/200; 718/107; 713/155, 168
See application file for complete search history.

(56) References Cited

U.S. PATENT DOCUMENTS

| 6,185,615 | B1 * | 2/2001 | Labiaga et al. ............. 709/224 |
| 7,047,426 | B1 * | 5/2006 | Andrews et al. ............ 713/155 |
| 7,171,494 | B2 * | 1/2007 | Karamanolis et al. ....... 709/250 |
| 7,231,407 | B2 | 6/2007 | Brodersen et al. |
| 7,509,448 | B2 * | 3/2009 | Fachan et al. ............... 710/200 |
| 2007/0214161 | A1 * | 9/2007 | Goyal et al. ................. 707/101 |

* cited by examiner

*Primary Examiner* — Peling Shaw
(74) *Attorney, Agent, or Firm* — Robert C. Rolnik; David A. Mims

(57) ABSTRACT

A computer implemented method and apparatus for rebooting a host having a plurality of network interfaces. A server reboots the host by stopping an NFS server process on the host. The server sends at least one consolidated notification to a plurality of clients identified in a consolidated notification table, wherein the consolidated notification comprises at least two addresses of network interfaces of the host. The server determines that an acknowledgement is received from each of the plurality of clients. The server halts resending of consolidated notifications, responsive to determining that an acknowledgement is received from the each of the plurality of clients.

4 Claims, 5 Drawing Sheets

CONSOLIDATED NOTIFICATIONS TO NFS CLIENTS

BACKGROUND OF THE INVENTION

1. Field of the Invention

The present invention relates generally to a computer implemented method, data processing system, and computer program product for exchanging file status information among networked computers. More specifically, the present invention relates to communicating discontinuities in file service to clients of a Network File System (NFS) server.

2. Description of the Related Art

The Network File System (NFS) is a standard network protocol that makes files stored on a file server accessible to any computer on a network. The NFS client protocol provides access to files that reside on the remote server, in the same way as a client's local file system provides access to files that are stored on a local disk. NFS is transparent to client applications and exposes a traditional file system interface.

The NFS client protocol makes Remote Procedure Calls (RPCs) to the remote server in order to implement access to the files. The interface is implemented by the NFS protocol using RPCs. The RPC layer also provides methods for data representation that are independent of the host architecture. For example, when a client application needs to write to a file that resides in a remote server, it calls a generic write( ) system call. The NFS client protocol implements the write( ) call by invoking a request to the remote server via the RPC layer. RPC marshals the data and parameters of the write( ) call in to a message and encodes the latter in an architecture independent format. The message is sent to the remote host via the TCP/IP protocol stack. The TCP/IP stack of the server delivers the message to the RPC layer, where it is unpacked and passed to the NFS server protocol. The NFS server protocol implements the write( ) operation by accessing the server's local file system. A reply is sent back to the client through the NFS, RPC, and TCP/IP protocol layers.

The RPC layer uses standard external data representation (XDR) for the information exchanged between different computer architectures. NFS on a file server provides a transparent, stateless access to shared data.

SUMMARY OF THE INVENTION

The present invention provides a computer implemented method and apparatus for rebooting a host having a plurality of network interfaces. A server reboots the host by stopping an NFS server process on the host. The server sends at least one consolidated notification to a plurality of clients identified in a consolidated notification table, wherein the consolidated notification comprises at least two addresses of network interfaces of the host. The server determines that an acknowledgement is received from each of the plurality of clients. The server halts resending of consolidated notifications, responsive to determining that an acknowledgement is received from the each of the plurality of clients.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
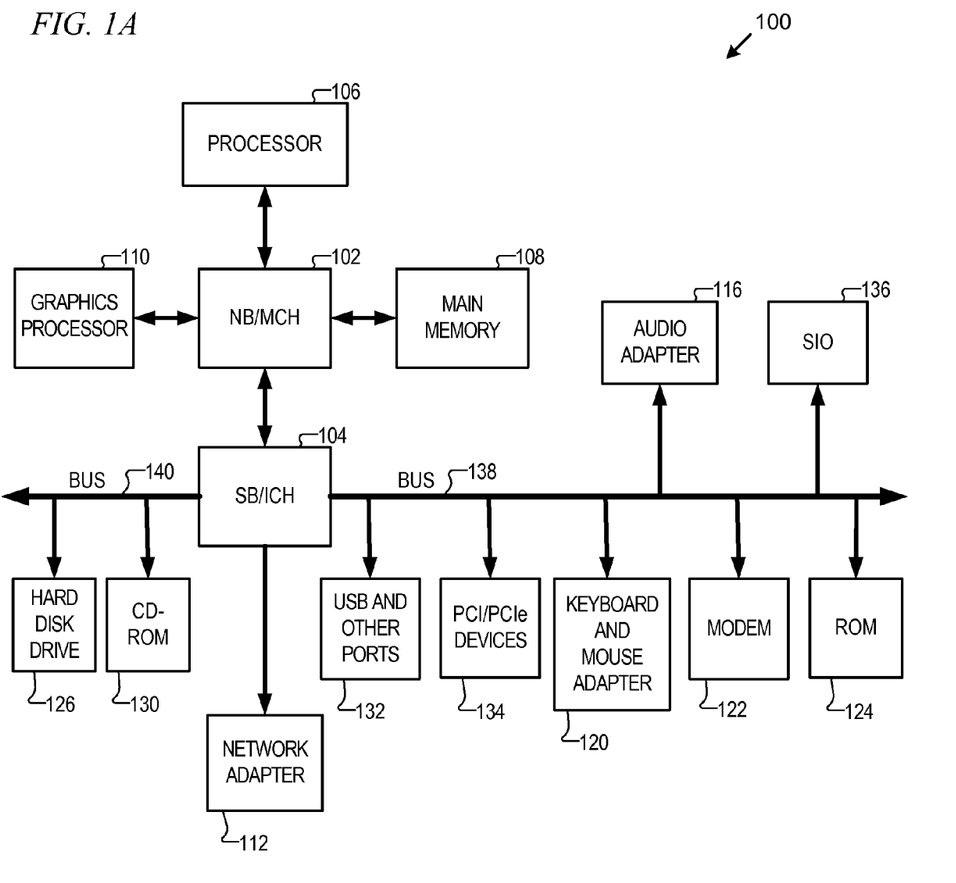
FIG. 1A is a data processing system in accordance with an illustrative embodiment of the invention.

With reference now to the figures and in particular with reference to FIG. 1A, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1A. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1A may vary depending on the implementation. Other internal hardware or peripheral devices, such as flash memory, equivalent non-volatile memory, and the like, may be used in addition to or in place of the hardware depicted in FIG. 1A. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1A is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for consolidating notifications that previously had been sent in individual packets between a Network File System (NFS) server or host and its respective clients. In addition, one or more illustrative embodiments may operate in a heterogeneous networking environment comprising clients that are alternately single hostname notification capable or consolidated notification capable.

Figure 1B:
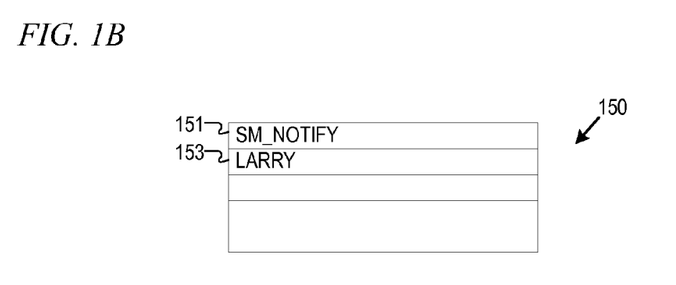
FIG. 1B is a conventional single hostname notification in accordance with an illustrative embodiment of the invention.

FIG. 1B is a conventional single hostname notification in accordance with an illustrative embodiment of the invention. The single hostname notification is a packet that carries several fields as a payload, and may also be referred to as a sm_notify. Single hostname notification 150 may include sm_notify 151 descriptor. Sm_notify can be a constant value selected by convention to indicate the nature and content of single hostname notification packets. Accordingly, a data processing system receiving such a notification may select a parsing algorithm with which to validate and respond to its contents. The remainder of the single hostname notification can be as described by a network status monitor protocol. For example, the single hostname notification includes a hostname. Hostname 153, in this example, is an arbitrarily selected string of characters "LARRY", which can be selected as a mnemonic by the system administrator to better conceptualize the hardware topology and location, or in any other manner suitable for managing the hardware as deemed by the administrator. According to protocols of the prior art, the single hostname notification is a packet to be sent when an NFS server restarts an NFS process. Accordingly, such packets have been sent to a client that observes the prior art protocol, namely a single hostname capable client. Such packets are sent in numbers that are equal to the number of the host's network interfaces times the number of hostnames associated with each network interface. The word 'single' in the term 'single hostname notification' refers to the limitation of the prior art notification to have a single hostname identified in the packet as being the network interface that hosts the NFS connection. In contrast, there can be many of these single hostname notifications sent to respond to a server restarting the NFS process. This practice of the prior art data processing systems can require the operation of a thread at the host for each packet sent.

A network interface is a hardware connector that permits a data processing system to communicate via one or more conduits or air interfaces with another data processing system. A network interface can be, for example, network (LAN) adapter 112 of FIG. 1A. A hostname is a user-selected name that can provide a user-friendly string with which to users may remember the network interface. Hostnames are sometimes called aliases, and like an alias, as the term is used to name people, each network interface may be associated with multiple hostnames. The hostname is unique within the network that the network interface is placed. The hostname can be a domain name, such as, for example, a fully qualified domain name.

Figure 2:
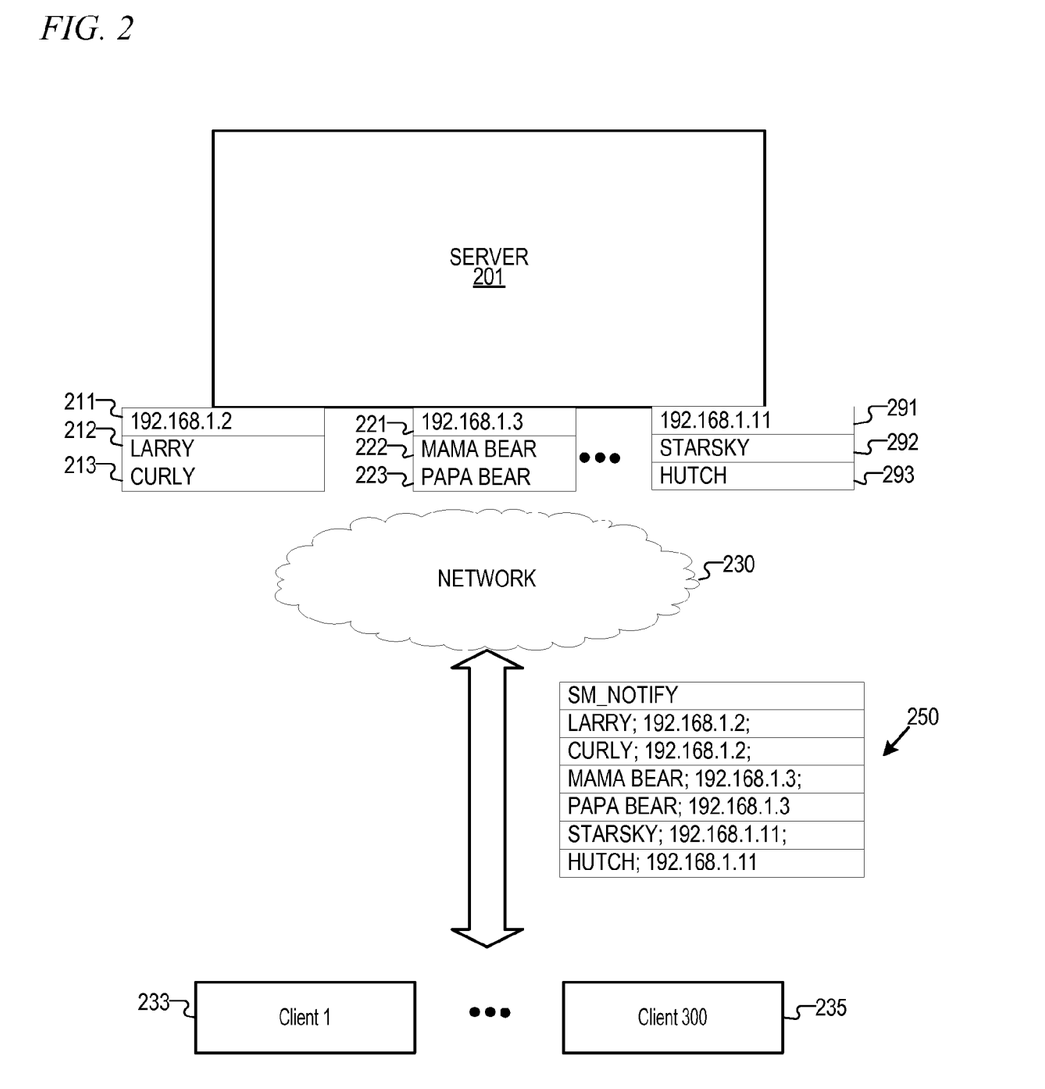
FIG. 2 is a network architecture of a NFS server and at least two clients in accordance with an illustrative embodiment of the invention.

FIG. 2 is a network architecture of a NFS server and at least two clients in accordance with an illustrative embodiment of the invention. Server 201 is a NFS server or host having at least three network interfaces having, respectively, internet protocol (IP) addresses 192.168.1.2 211, 192.168.1.3 221, and 192.168.1.11 291. In this example, each IP address corresponds with two hostnames. Thus, IP address 192.168.1.2 211 corresponds to LARRY 212 and CURLY 213. IP address 192.168.1.3 221 is associated with MAMA BEAR 222 and PAPA BEAR 223. In addition, IP address 192.168.1.11 293 is associated with STARSKY 292 and HUTCH 293. Each network interface attaches to network 230 in order to exchange packets with client 1 233 and client 300 235 which each may be NFS clients. Within this environment, server 201 may inform clients, such as client 1 233 and client 300 235, concerning any discontinuity in the server's ability to perform the NFS file protocol. In addition to single hostname notifications, such as described in FIG. 1B, server 201 can send consolidated notification 250 to each client that is consolidated notification capable, and informs the server of this capability.

A consolidated notification is a packet that uses a bit field adopted by convention and at least two addresses. The two addresses can be a hostname and an internet protocol (IP) address associated with the hostname. Alternatively, the two addresses can be two or more IP addresses of server, including, and up to, all network interfaces of the server assigned to support the NFS protocol.

In consolidated notification 250, all IP addresses and all hostnames or aliases of the network interfaces used to support NFS protocol are used to form a single packet, to the extent that the network supports a packet size required for a payload having the hostnames. Accordingly, for a client that is consolidated notification capable, the server can send one consolidation notification, in response to restarting a NFS process, to a single client, and thus convey all the information concerning which network interfaces handled files that the client may be accessing. Some embodiments may split the single packet into smaller packets in order to meet limitations established on a local area network. For example, the max transmit unit (MTU) may set a threshold at which a data processing system may divide the data content of the consolidated notification into several packets.

Some clients may be able to handle receiving packets (e.g. the prior art sm_notify) notifying of NFS process reboot according to the old NFS protocol. The old NFS protocol includes a single hostname notification that transmits one single hostname notification to each client for each hostname as described in FIG. 1B. In addition, one or more of these same clients may also support consolidated notifications as described further below. Accordingly, a system administrator may set a preferred protocol in such machines that are capable of receiving and parsing either form of notification, for example, as shown in FIG. 1B, or as shown in FIG. 2 as consolidated notification 250. A protocol preference of a client can be an administrator settable value of the client that indicates the manner in which the administrator prefers that the client receive consolidated notifications in response to server reboots. Alternatively, the protocol preference of the client can be an administrator settable value of the client that indicates that the administrator does not prefer that the client receive consolidated notifications. The administrator may set the value indirectly through a user interface. Other program actions, alternatively, can be used to set the value.

Prior to upgrading a protocol between server and client to use the consolidated notifications, a server may collect information concerning the protocol preference from one or more clients. Accordingly, once the server segregates its clients into clients that prefer consolidated notifications and clients that prefer single hostname notifications (as in prior art sm_notify), the server may select a packet type that can better suit the architecture of the network, including protocol preferences. The process of segregating the clients into these two groups may comprise the server assigning a client to be within one of two tables: a single hostname notification table or a consolidated notification table. A single hostname notification table is a table that identifies clients that are known to have a single hostname notification preference, or at least have not responded to indicate a preference with respect to consolidated notifications. A consolidated notification table is a table that identifies clients that have indicated a preference to receive consolidated notifications, as will be explained further below. As is appreciated, each of these tables may identify zero, one or more clients in a suitable manner, by listing, for example, client addresses, such as IP addresses or hostnames, among others. Accordingly, by referencing one or both of these tables, a server can efficiently respond after experiencing a server reboot. A server reboot can be any action that causes a previously executing NFS server process to restart. In addition, the server reboot can include restarting a subset of processes on the server, including, for example, restart of the status daemon. The network status monitor or status daemon can be, for example, statd instructions executing on a processor. An NFS server process is one or more threads that may cooperate to respond to file accesses that may be received and/or transmitted over a network. The NFS server may follow at least the accepted standards and conventions, such as, described in the Internet Engineering Task Force (IETF) request for comments (RFC) 1813, and extensions of RFC 1813. It is appreciated that the network status monitor may be called statmon or statd, depending on the data processing system environment.

One way that clients coordinate access of a file is by using a file lock. A file lock can be defined in a data structure stored on a client that associates a file access with an inode on the host system, as well as a hostname of the host system or NFS server. The data structure, for example, can be as used in some clients using the Linux operating system, the UNIX operating system and other UNIX-like operating systems. In this example, a file, typically called "/var/statmon/sm" can store the associations between the locked file and the host system.

Figure 3:
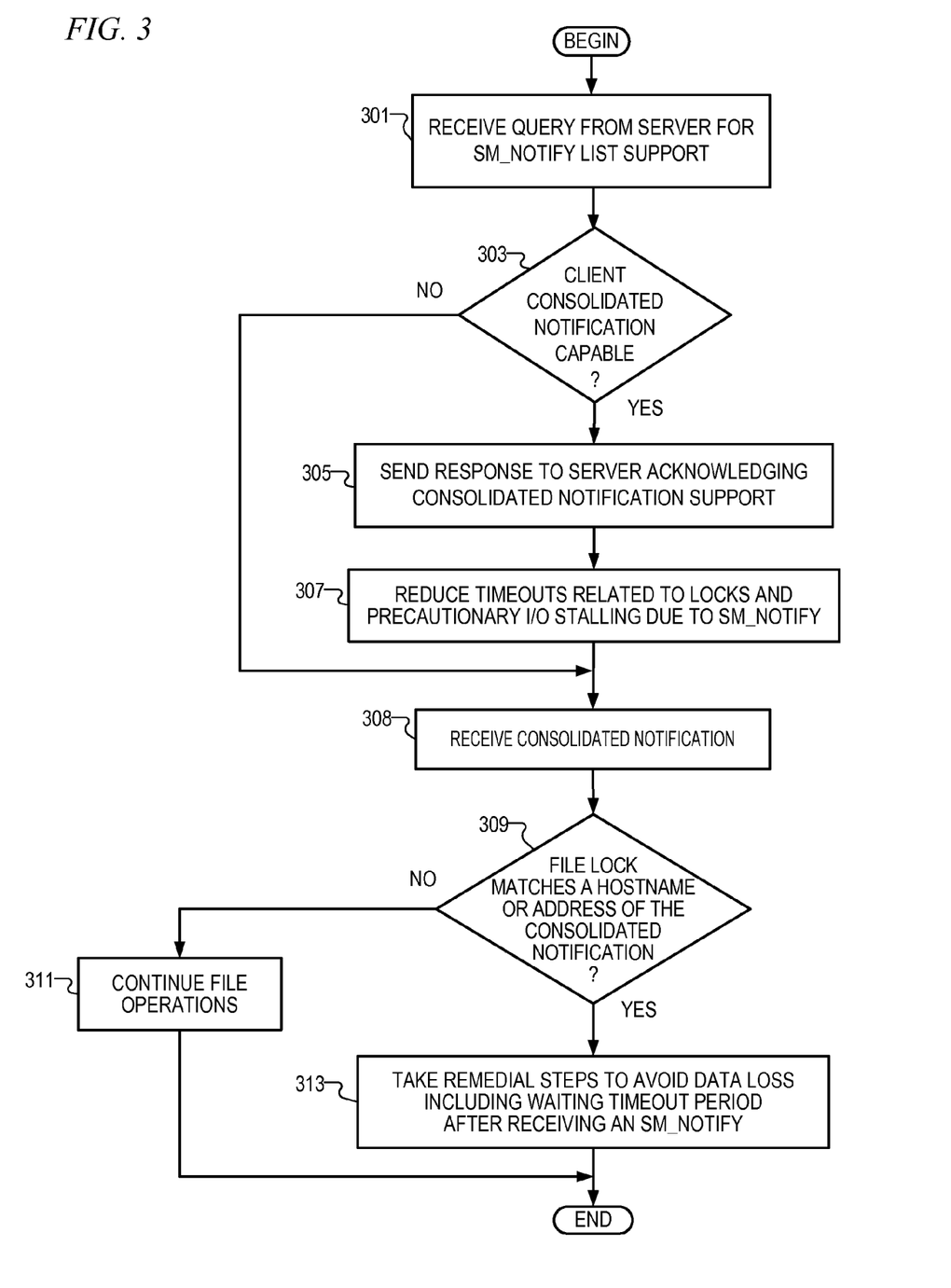
FIG. 3 is a flowchart of client-executed steps to coordinate handling of service discontinuities in a NFS server in accordance with an illustrative embodiment of the invention.

FIG. 3 is a flowchart of client-executed steps to coordinate handling of service discontinuities in a NFS server in accordance with an illustrative embodiment of the invention. Initially, the client may receive a consolidated notification query from a server, which hosts files that the client accesses, for sm_notify list support (step 301). A consolidated notification query is a message sent from an NFS server that requests the client to identify a preferred protocol. The consolidated notification query may include a bit field that may identify the type of packet to be a consolidated notification query. The bit field selected can be a constant adopted by convention or by standard within the data processing industry to signal that the message requests of the client a response, if the client is able, to identify the protocol preference of the client.

Next, the client determines whether the client is consolidated notification capable (step 303). The client may make this determination based on a combination of whether the client has machine instructions to parse a consolidated notification, as well as whether the administrator of the client has indicated a protocol preference to use the consolidated notifications. Accordingly, if the determination is positive, the client may send a response to the server, which acknowledges consolidated notification support (step 305). A consolidated notification capable acknowledgement is a message transmitted or received in response to a consolidated notification query. The consolidated notification capable acknowledgement can be the response sent in step 305. Thus, the response may be a packet that includes one or more bits that signal the capability and/or protocol preference of the client to the server.

Next, the client may reduce timeouts related to file locks and precautionary i/o stalling due to sm_notify (step 307). In other words, the client may prepare for future discontinuities in NFS service to be indicated using a consolidated notification as described above. Accordingly, a client that reduces its applicable timeouts can anticipate a more rapid recovery at the server to NFS service discontinuity than formerly available using solely single hostname notifications. A timeout is a period between a first event and a second event where if a second event fails to arrive during the period, the second event is described as failing the timeout. The timeout can be expressed as a relative duration of time to be applied as a test each time the first event occurs. Accordingly, a data processing may test for multiple timeouts concurrently when multiple instances of a first event occur. A negative determination at step 303 will bypass the steps 305-307 and send the query to step 308.

Next, the client may receive a consolidated notification (step 308). The client may have outstanding file locks on files hosted at a network interface. Accordingly, the client determines if the file lock matches a hostname or other address of the consolidated notification (step 309). In case of a negative determination, the client may continue file operations reliant on the file lock (step 311). However, a positive result to step 309 can indicate that a pending operation on the file was not completed prior to the server restarting the NFS process. Accordingly, in response to a determination that the file lock matches the hostname, the client may take remedial action to avoid data loss relating to pending operations on the file (step 313). Remedial action can include performing a reclaim request, as defined in RFC 3530 (NFS version 4 Protocol, Shepler et al, April 2003), which is herein incorporated by reference. Alternatively, step 309 may also generate a positive determination in response to a matched IP address. Processing may terminate after steps 311 or 313.

Figure 4:
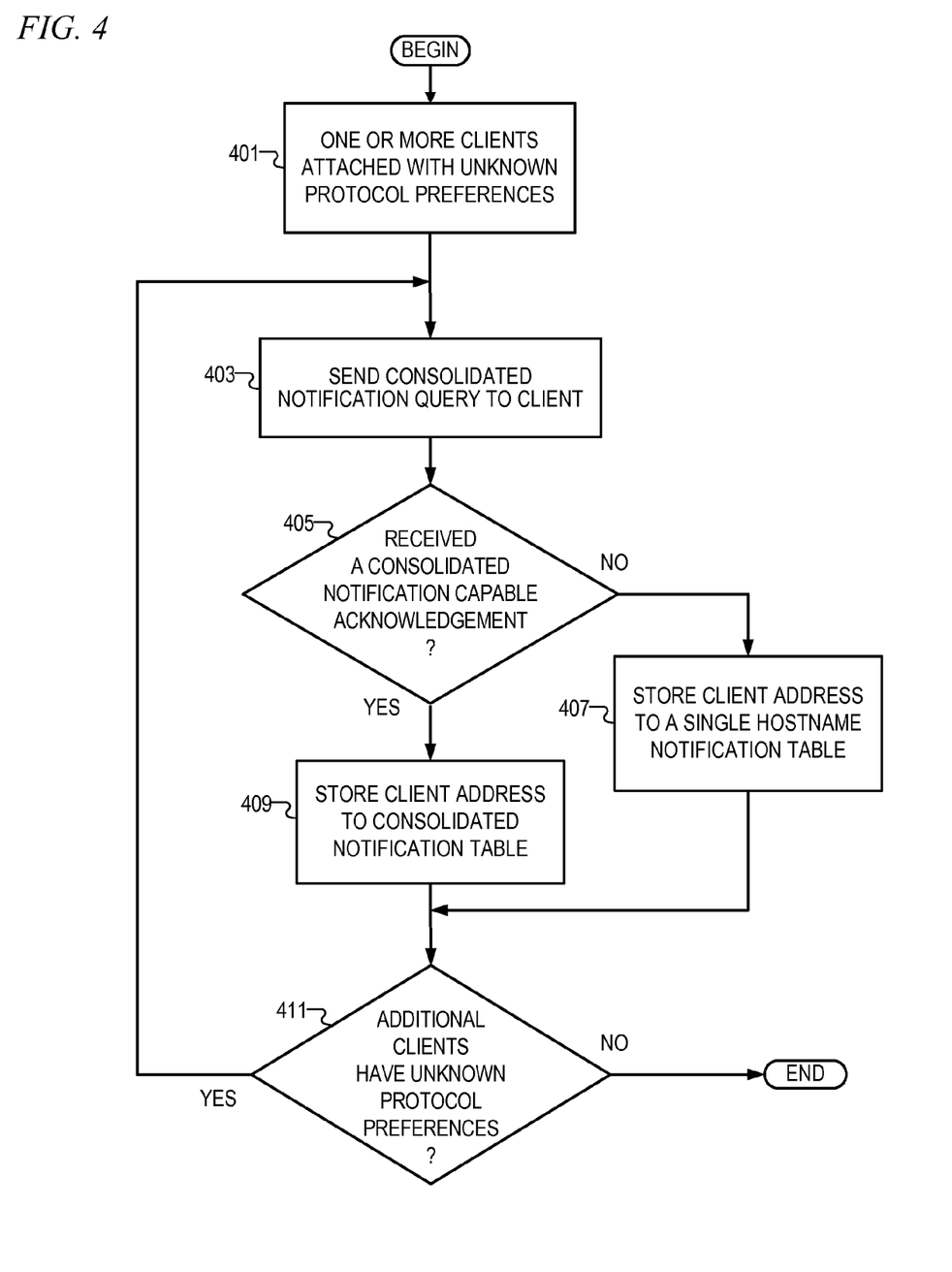
FIG. 4 is a flowchart of server-executed steps to assimilate a client into a consolidated notice generating scheme in accordance with an illustrative embodiment of the invention.

FIG. 4 is a flowchart of server-executed steps to assimilate a client into a consolidated notice generating scheme in accordance with an illustrative embodiment of the invention. Initially, the server may receive attachment by one or more clients with unknown protocol preferences (step 401). The server make treat the clients as having unknown protocol preferences insofar as the server lacks information sufficient to determine if a client is consolidated notification capable. Next, the server may send a consolidated notification query to the client (step 403). Next, the server may determine whether the client acknowledges by determining if the server received a consolidated notification capable acknowledgement (step 405). If no acknowledgement is returned or the acknowledgement is a negative acknowledgement, the server may store the client address to a single hostname notification table (step 407). Step 407 may be conditional on the client address not already being present in the single hostname notification table.

On the other hand, a positive determination to step 405 may result in the server storing the client address to the consolidated notification table (step 409). Following steps 407 or 409, the server may determine if additional clients have unknown protocol preferences (step 411). If further such clients exist, the server will continue with a positive determination from step 411 to repeat step 403. Otherwise, processing may terminate thereafter.

Figure 5:
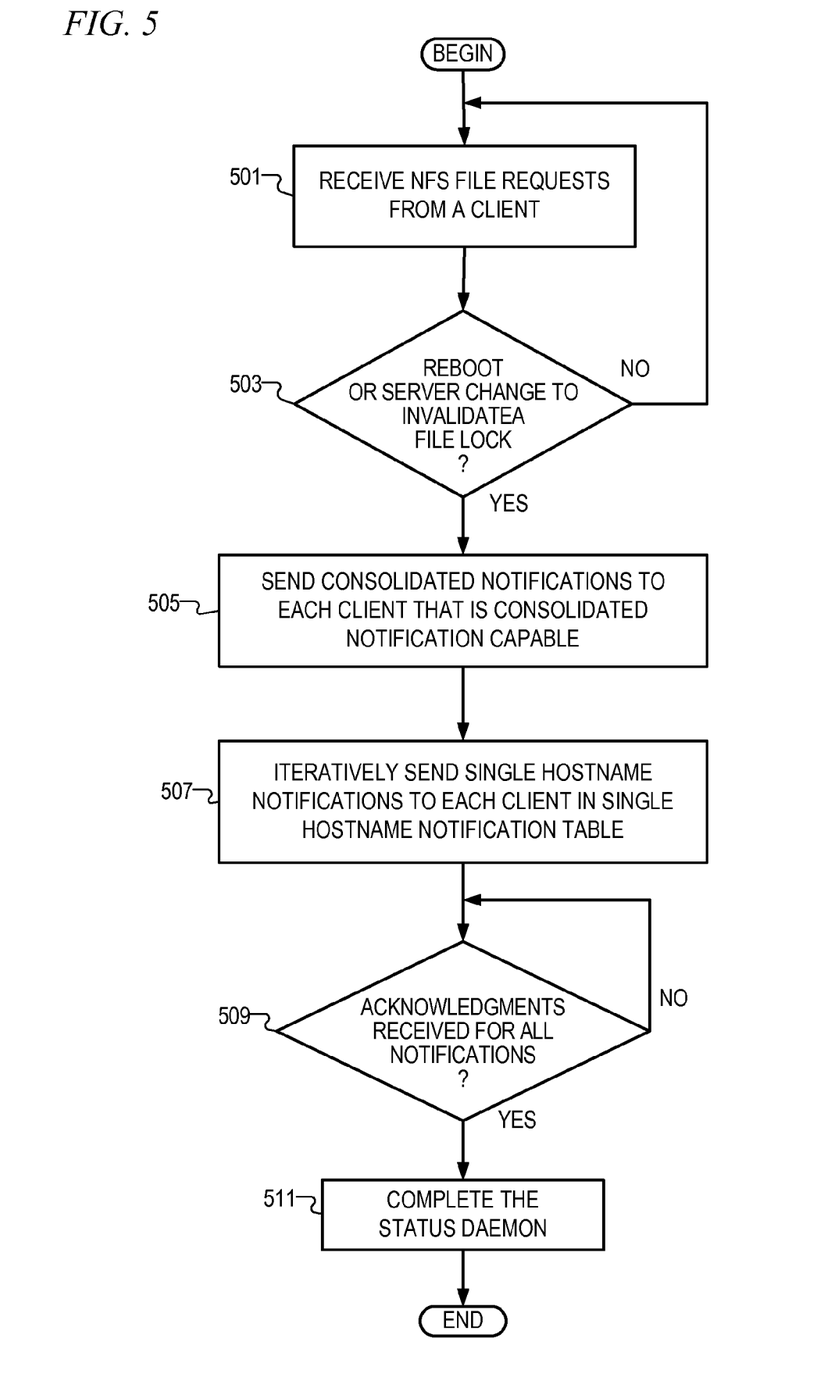
FIG. 5 is a flowchart of server-executed steps that include responding to a NFS service discontinuity in accordance with an illustrative embodiment of the invention.

FIG. 5 is a flowchart of server-executed steps that include responding to a NFS service discontinuity in accordance with an illustrative embodiment of the invention. The server may execute the steps of FIG. 5 by using a specialty process that may include machine readable code to that a processor may execute. The process can be an enhanced version of a status daemon or statd. Initially, the server may receive NFS file requests from a client (step 501). This step can include the client setting a lock for each file so requested. The step can be in response to a client requesting a record lock for a region in a file. Next, the server may determine whether a reboot has occurred or another server change has occurred to invalidate a file lock (step 503). A negative determination may result in the process returning to the beginning, before step 501.

A positive determination may result in the server sending consolidated notifications to each client that is consolidated notification capable (step 505). Step 505 can be performed based on the entries for each client in a consolidated notification table. Next, the server may iteratively send single hostname notifications to each client that is in a single hostname notification table (step 507).

Next, the server may determine, for each notification sent in steps 505 and 507, whether an acknowledgement has been received (step 509). An acknowledgement is a message sent from a client that acknowledges the restart of the NFS server process or other activity that was detected in step 503. In response to a positive determination, the server may complete a status daemon operation (step 511). Processing may terminate thereafter.

The status daemon may initiate a single thread to perform steps 505 through 511. After step 511 or concurrent with executing step 511, the server may free up resources allocated to the thread. A thread is a processor state, resources allocated to a processor and machine instructions that are allocated processing time on the processor until a final step of the machine instructions are executed. A thread may be one among several threads that compete for time or clock cycles of the processor where the processor executes a single instruction at a time.

The aspects of the illustrative embodiments provide a computer implemented method, data processing system, and computer program product for consolidating notifications that previously had been sent in individual packets between a NFS server or host and its respective clients. In addition, one or more illustrative embodiments may operate in a heterogeneous networking environment comprising clients that are alternately single hostname notification capable or consolidated notification capable.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method to retain file network access to a file, the computer implemented method comprising:
   receiving a consolidated notification query from a host that serves a plurality of files;
   determining whether a client is consolidated notification list capable, wherein a consolidated notification capable acknowledgement is a message received in response to a consolidated notification query, and affirmatively confirms a protocol preference of a client to receive consolidated notifications in response to server reboots;
   responsive to a determination that the client is consolidated notification capable, sending a consolidated notification capable acknowledgement to the host;
   receiving a consolidated notification, wherein the consolidated notification comprises at least two addresses of network interfaces of the host;
   determining whether a file lock matches a host in the consolidated notification; and
   responsive to a determination that the file lock matches the hostname, taking remedial action to avoid data loss relating to pending operations on a file, wherein the file corresponds to the file lock.

2. The computer implemented method of claim 1, further comprising:
   determining whether a second file lock fails to match any hostname in the consolidated notification; and
   responsive to a determination that the second file lock fails to match any hostname, accessing a second file corresponding to the second file lock.

3. The computer implemented method of claim 1, further comprising:
   attaching to a server in order to access a file on the file server, wherein receiving a consolidated notification query is responsive to attaching.

4. The computer implemented method of 1, wherein the consolidated notification includes an internet protocol address paired to a hostname; and in determining whether the file lock matches the hostname, the client skips looking up the internet protocol address.

* * * * *